United States Patent
Kim et al.

(10) Patent No.: US 11,657,966 B2
(45) Date of Patent: May 23, 2023

(54) MULTILAYER ELECTRONIC COMPONENT

(71) Applicant: SAMSUNG ELECTRO-MECHANICS CO., LTD., Suwon-si (KR)

(72) Inventors: Kyeong Jun Kim, Suwon-si (KR); Ho In Jun, Suwon-si (KR); Seul Gi Kim, Suwon-si (KR); Jin Sung Chun, Suwon-si (KR); Jun Ho Yun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/338,124

(22) Filed: Jun. 3, 2021

(65) Prior Publication Data

US 2022/0093329 A1 Mar. 24, 2022

(30) Foreign Application Priority Data

Sep. 18, 2020 (KR) .......................... 10-2020-0120559

(51) Int. Cl.
*H01G 4/005* (2006.01)
*H01G 4/248* (2006.01)
*H01G 4/30* (2006.01)

(52) U.S. Cl.
CPC ............. *H01G 4/005* (2013.01); *H01G 4/248* (2013.01); *H01G 4/30* (2013.01)

(58) Field of Classification Search
CPC ........... H01G 4/005; H01G 4/248; H01G 4/30
See application file for complete search history.

(56) References Cited

U.S. PATENT DOCUMENTS

| | | | |
|---|---|---|---|
| 10,840,018 B2 * | 11/2020 | Berolini | H01G 4/30 |
| 2013/0107417 A1 * | 5/2013 | Cho | H01G 4/012 29/25.42 |
| 2013/0107422 A1 * | 5/2013 | Lee | H01G 4/12 336/200 |

(Continued)

FOREIGN PATENT DOCUMENTS

| | | | | |
|---|---|---|---|---|
| JP | H08-191034 A | | 7/1996 | |
| JP | 2005216955 A | * | 8/2005 | ............... H01G 4/12 |

(Continued)

*Primary Examiner* — Dion R. Ferguson
(74) *Attorney, Agent, or Firm* — Morgan, Lewis & Bockius LLP

(57) ABSTRACT

A multilayer electronic component includes: a body including first and second dielectric layers alternately disposed in a first direction; and external electrodes disposed on opposing end surfaces, respectively. A first internal electrode exposed to a first end surface and a first dummy pattern spaced apart from the first internal electrode and exposed to a second end surface are disposed on the first dielectric layer. A second internal electrode exposed to the second end surface and a second dummy pattern spaced apart from the second internal electrode and exposed to the first end surface are disposed on the second dielectric layer. The first and second internal electrodes include first and second main portions, respectively, and the first main portion and the second main portion are arranged in a staggered manner in a width direction.

18 Claims, 4 Drawing Sheets

(56) References Cited

U.S. PATENT DOCUMENTS

| | | | | |
|---|---|---|---|---|
| 2013/0241361 A1* | 9/2013 | Lee | ............... | H01F 27/292 |
| | | | | 336/200 |
| 2014/0240895 A1* | 8/2014 | Lee | ............... | H01G 4/12 |
| | | | | 29/25.42 |
| 2015/0041197 A1* | 2/2015 | Lee | ............... | H01G 2/06 |
| | | | | 361/301.4 |
| 2016/0233024 A1* | 8/2016 | Kim | ............... | H01G 4/30 |
| 2017/0352483 A1* | 12/2017 | Mochigi | ............... | H01G 4/232 |
| 2019/0096584 A1* | 3/2019 | Hong | ............... | H01G 4/30 |
| 2019/0131067 A1* | 5/2019 | Berolini | ............... | H01G 4/012 |
| 2022/0172891 A1* | 6/2022 | Berolini | ............... | H01G 4/012 |

FOREIGN PATENT DOCUMENTS

| | | | | |
|---|---|---|---|---|
| JP | 2022104205 A | * | 7/2022 | ............. H01G 4/008 |
| KR | 10-2013-0047886 A | | 5/2013 | |
| KR | 10-1452126 B1 | | 10/2014 | |
| KR | 101474138 B1 | * | 12/2014 | |

\* cited by examiner

P

II-II'

MULTILAYER ELECTRONIC COMPONENT

CROSS-REFERENCE TO RELATED APPLICATION(S)

This application claims the benefit of priority to Korean Patent Application No. 10-2020-0120559, filed on Sep. 18, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and increase in capacitance of multilayer ceramic capacitors has increased.

Meanwhile, recently, in accordance with an increase in an interest in electronic components for vehicles in the automotive industry, the multilayer ceramic capacitors have also been required to have high reliability and high strength characteristics in order to be used in the vehicle or an infotainment system.

As the numbers of stacked dielectric layers and internal electrodes are increased, accumulation of step portions formed due to thickness differences between internal electrodes and dielectric layers may increase. The accumulation of step portions may cause a warpage phenomenon in distal end portions of the internal electrodes due to stretching of the dielectric layers in a transversal direction in a densifying process of compressing a body.

That is, the distal end portions of the internal electrodes are warped in order to fill the step portions, and margin portions remove empty spaces resulting from the step portions by depression of covers and reduction in a margin width. As the empty spaces resulting from the step portions are removed, capacitance layers are also stretched by the reduced margin width. Reliability of the multilayer ceramic capacitor, such as a breakdown voltage, is reduced due to structural irregular stretching of the internal electrodes as described above.

The generation and accumulation of such step portions may be problematic in both of a length direction and a width direction of the multilayer ceramic capacitor and a method for solving the generation of step portions is thus required.

SUMMARY

An aspect of the present disclosure may provide a multilayer electronic component in which a step portion problem may be solved.

Another aspect of the present disclosure may provide a multilayer electronic component of which reliability is improved.

Another aspect of the present disclosure may provide a multilayer electronic component of which a breakdown voltage is improved.

According to an aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction and including first and second dielectric layers alternately disposed in the first direction; and external electrodes disposed on the third and fourth surfaces, respectively, wherein a first internal electrode exposed to the third surface and a first dummy pattern spaced apart from the first internal electrode and exposed to the fourth surface are disposed on the first dielectric layer, a second internal electrode exposed to the fourth surface and a second dummy pattern spaced apart from the second internal electrode and exposed to the third surface are disposed on the second dielectric layer, the first internal electrode includes a first main portion disposed to be spaced apart from the fifth and sixth surfaces and first and second side portions disposed on opposite side surfaces of the first main portion, respectively, and exposed to the third surface, the second internal electrode includes a second main portion disposed to be spaced apart from the fifth and sixth surfaces and third and fourth side portions disposed on opposite side surfaces of the second main portion, respectively, and exposed to the fourth surface, and the first main portion and the second main portion are arranged in a staggered manner in the third direction.

According to another aspect of the present disclosure, a multilayer electronic component may include: a body including first and second dielectric layers alternately disposed in a stacked direction, first and second internal electrodes disposed on the first and second dielectric layers, respectively, and first and second dummy patterns disposed on the first and second dielectric layers and spaced apart from the first and second internal electrodes, respectively; external electrodes disposed on first and second end surfaces of the body, respectively, opposing each other in a length direction. The first internal electrode and the first dummy pattern are exposed to the first and second end surfaces, respectively, and the second internal electrode and the second dummy pattern are exposed to the second and first end surfaces, respectively, and outer edges of the first and second internal electrodes deviate from each other in a width direction perpendicular to the length direction and the stacked direction.

According to still another aspect of the present disclosure, a multilayer electronic component may include: a body including first and second dielectric layers alternately disposed in a stacked direction, first and second internal electrodes disposed on the first and second dielectric layers, respectively, and first and second dummy patterns disposed on the first and second dielectric layers and spaced apart from the first and second internal electrodes, respectively;

external electrodes disposed on first and second end surfaces of the body, respectively, opposing each other in a length direction. The first internal electrode and the first dummy pattern are exposed to the first and second end surfaces, respectively, and the second internal electrode and the second dummy pattern are exposed to the second and first end surfaces, respectively, and a width of at least one of the first and second dummy patterns changes in the length direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
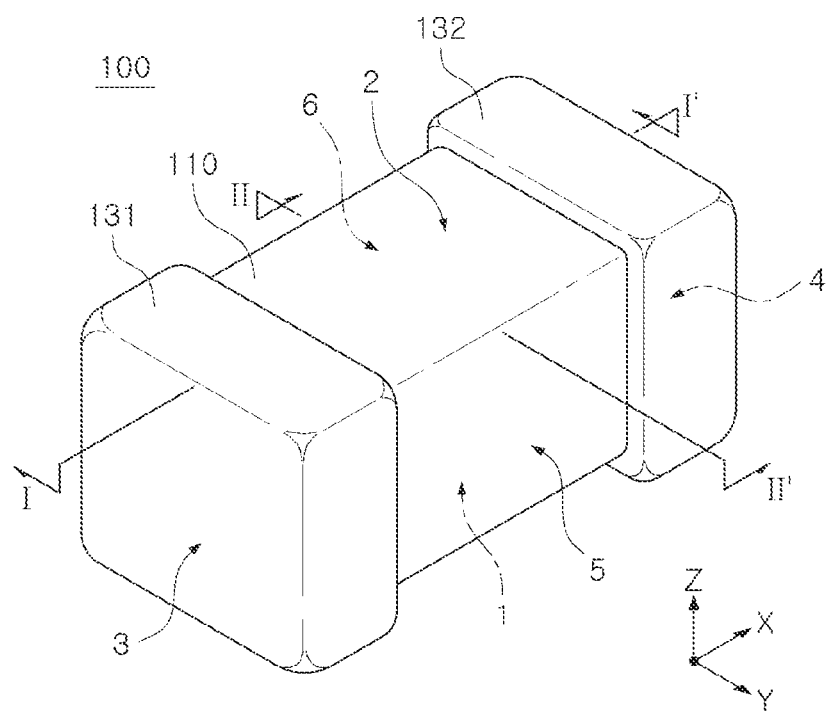
FIG. 1 is a schematic perspective view illustrating a multilayer electronic component according to an exemplary embodiment in the present disclosure.

Hereinafter, exemplary embodiments of the present disclosure will be described in detail with reference to the accompanying drawings.

In the drawings, an X direction refers to a second direction or a length direction of a body, a Y direction refers to a third direction or a width direction of the body, and a Z direction refers to a first direction, a thickness direction of the body, or a stacked direction.

Multilayer Electronic Component

FIG. 1 is a schematic perspective view illustrating a multilayer electronic component according to an exemplary embodiment in the present disclosure.

Figure 2:
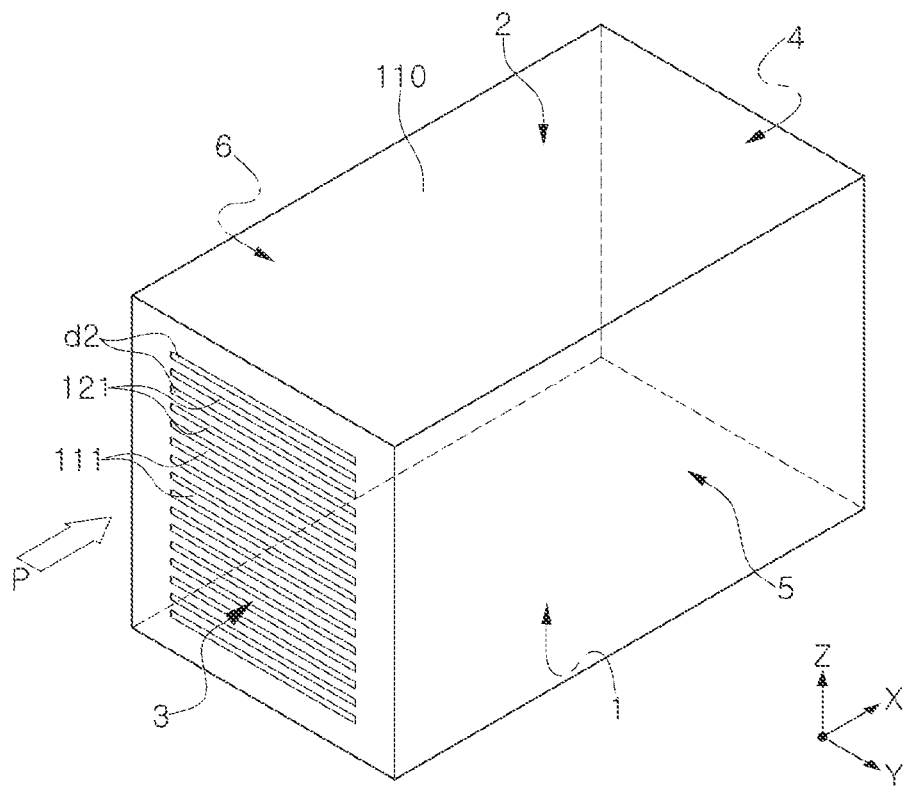
FIG. 2 is a perspective view illustrating a body in a state in which external electrodes are excluded from the multilayer electronic component of FIG. 1.

FIG. 2 is a perspective view illustrating a body in a state in which external electrodes are excluded from the multilayer electronic component of FIG. 1.

Figure 3:
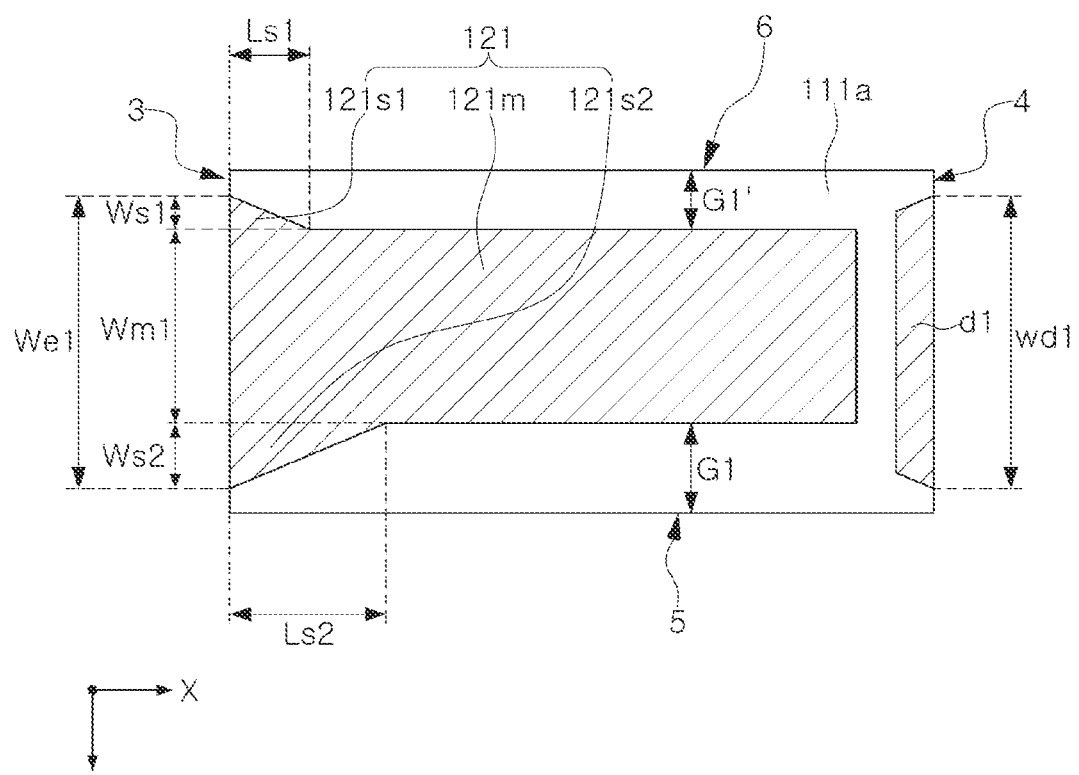
FIG. 3 is a plan view of a first dielectric layer according to an exemplary embodiment in the present disclosure.

FIG. 3 is a plan view of a first dielectric layer according to an exemplary embodiment in the present disclosure.

Figure 4:
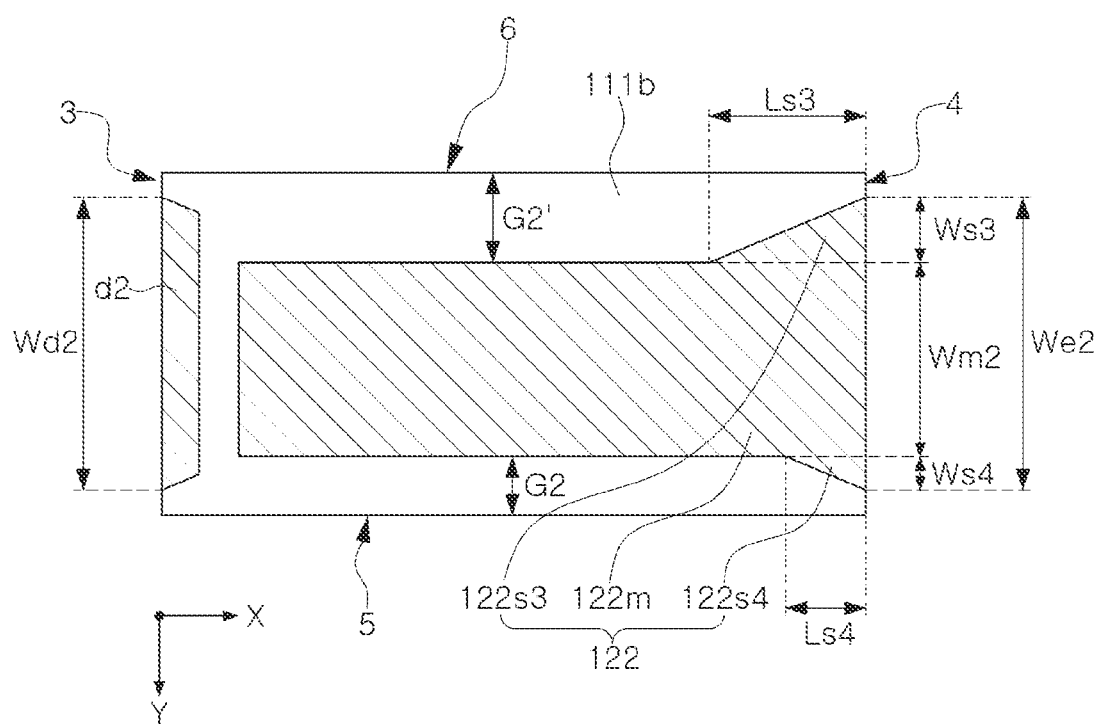
FIG. 4 is a plan view of a second dielectric layer according to an exemplary embodiment in the present disclosure.

FIG. 4 is a plan view of a second dielectric layer according to an exemplary embodiment in the present disclosure.

Figure 5:
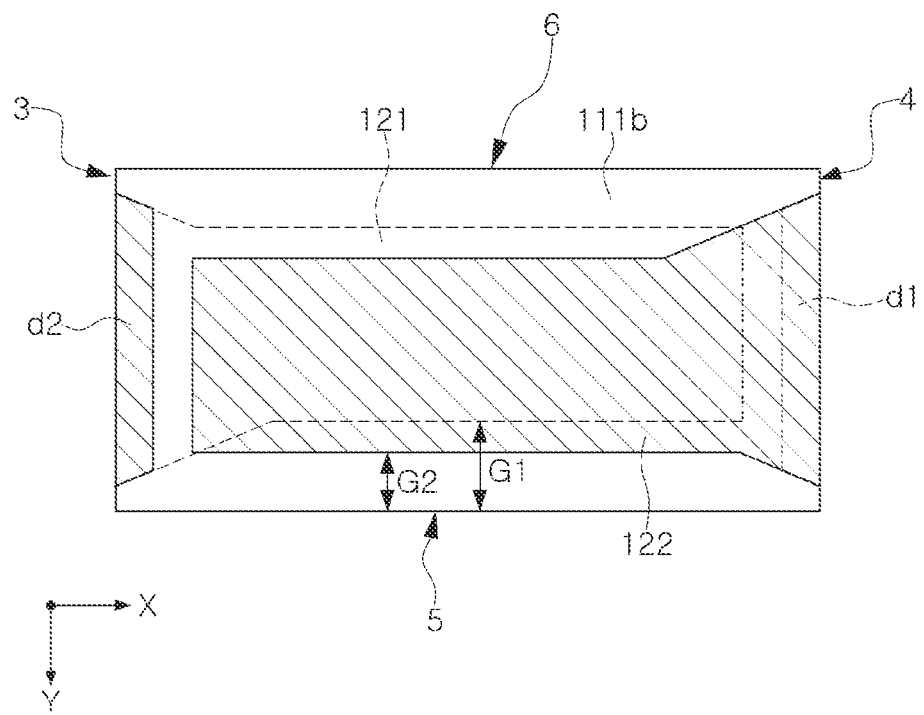
FIG. 5 is a plan view illustrating that first and second dielectric layers according to an exemplary embodiment in the present disclosure overlap each other.

FIG. 5 is a plan view illustrating that first and second dielectric layers according to an exemplary embodiment in the present disclosure overlap each other.

Figure 6:
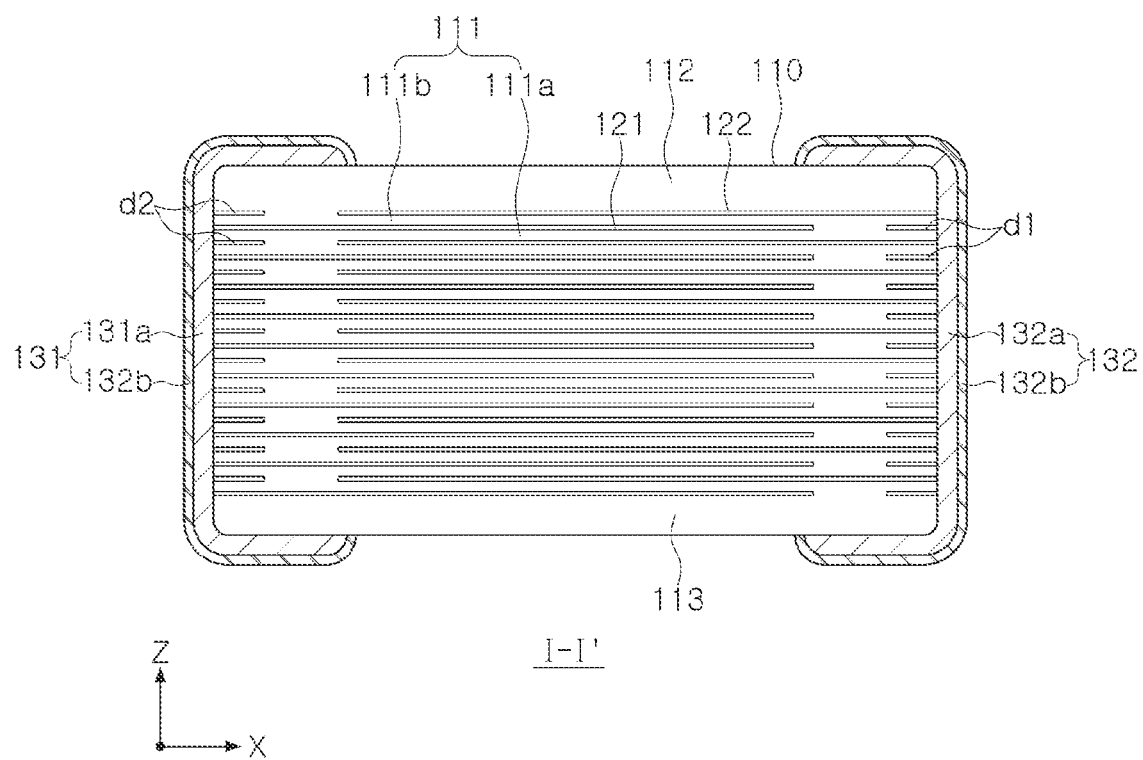
FIG. 6 is a cross-sectional view taken along line I-I' of FIG. 1.

FIG. 6 is a cross-sectional view taken along line I-I' of FIG. 1.

Figure 7:
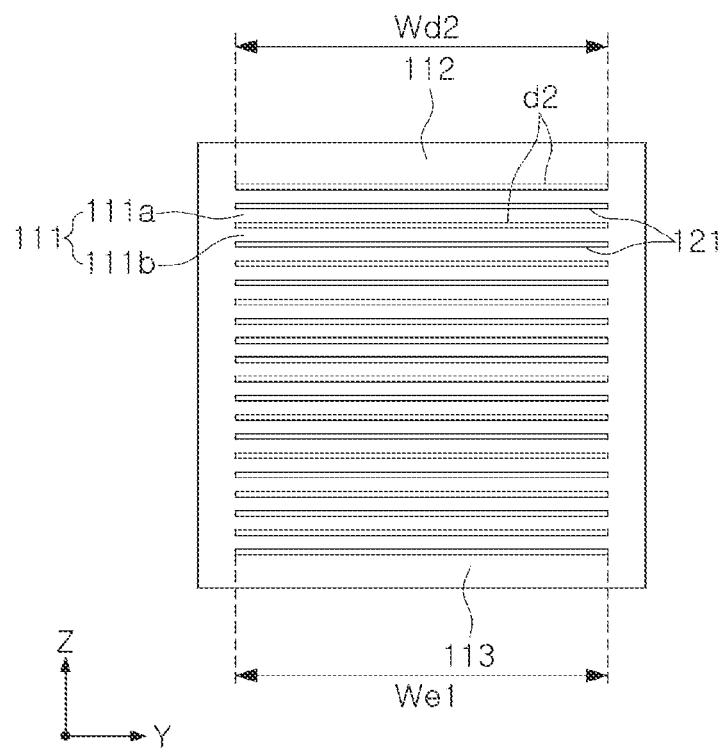
FIG. 7 is a view of the body of FIG. 2 when viewed from direction P of FIG. 2.

FIG. 7 is a view of the body of FIG. 2 when viewed from direction P of FIG. 2.

Figure 8:
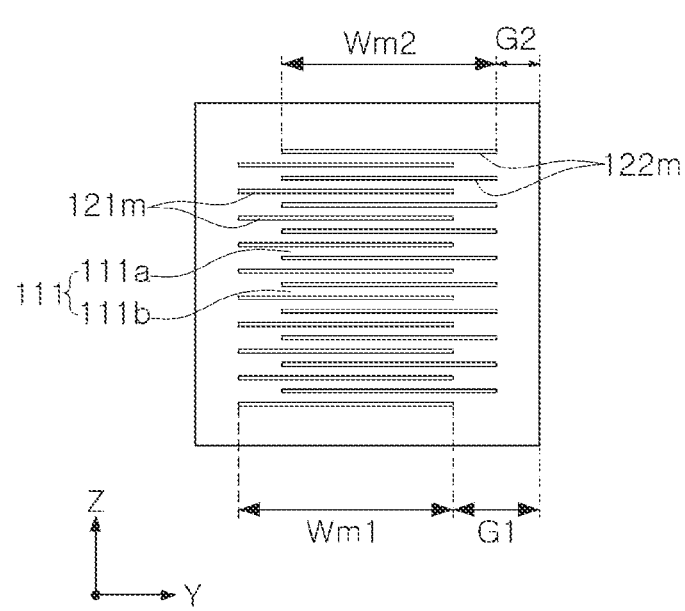
FIG. 8 is a cross-sectional view taken along line II-II' of FIG. 1.

FIG. 8 is a cross-sectional view taken along line II-II' of FIG. 1.

Hereinafter, a multilayer electronic component 100 according to an exemplary embodiment in the present disclosure will be described with reference to FIGS. 1 through 8.

The multilayer electronic component 100 according to an exemplary embodiment in the present disclosure may include: a body 110 having first and second surfaces 1 and 2 opposing each other in the first direction (the Z direction), third and fourth surfaces 3 and 4 connected to the first and second surfaces and opposing each other in the second direction (the X direction), and fifth and sixth surfaces 5 and 6 connected to the first to fourth surfaces and opposing each other in the third direction (the Y direction) and including first and second dielectric layers 111a and 111b alternately disposed in the first direction (the Z direction); and external electrodes 131 and 132 disposed on the third and fourth surfaces, respectively, wherein a first internal electrode 121 exposed to the third surface and a first dummy pattern d1 spaced apart from the first internal electrode and exposed to the fourth surface are disposed on the first dielectric layer 111a, a second internal electrode 122 exposed to the fourth surface and a second dummy pattern d2 spaced apart from the second internal electrode and exposed to the third surface are disposed on the second dielectric layer 111b, the first internal electrode 121 includes a first main portion 121m disposed to be spaced apart from the fifth and sixth surfaces and first and second side portions 121s1 and 121s2 disposed on opposite side surfaces of the first main portion, respectively, and exposed to the third surface, the second internal electrode 122 includes a second main portion 122m disposed to be spaced apart from the fifth and sixth surfaces and third and fourth side portions 122s3 and 122s4 disposed on opposite side surfaces of the second main portion, respectively, and exposed to the fourth surface, and the first main portion 121m and the second main portion 122m are arranged in a manner staggered in the third direction. In other words, outer edges of the first and second main portions 121m and 122m deviate from each other in the third direction.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder particles included in the body 110 in a sintering process, the body 110 may have a substantially hexahedral shape.

The body 110 may have the first and second surfaces 1 and 2 opposing each other in the first direction (the Z direction), the third and fourth surfaces 3 and 4 connected to the first and second surfaces 1 and 2 and opposing each other in the second direction (the X direction), and the fifth and sixth surfaces 5 and 6 connected to the first and second surfaces 1 and 2, connected to the third and fourth surfaces 3 and 4, and opposing each other in the third direction (the Y direction). The first and second surfaces 1 and 2 may be upper and lower surfaces of the body 110, the third and fourth surfaces 3 and 4 may be first and second end surfaces of the body 110, and the fifth and sixth surfaces 5 and 6 may be first and second side surfaces of the body 110.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$, $Ba(Ti_{1-y}Ca_y)O_3$, $(Ba_{1-x}Ca_x)$ $(Ti_{1-y}Zr_y)O_3$, $Ba$ $(Ti_{1-y}Zr_y)O_3$, or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

The body 110 may include a capacitance forming portion disposed in the body 110 and forming capacitance by including the first internal electrodes 121 and the second internal electrodes 122 disposed to face each other with each of the dielectric layers 111 interposed therebetween and protective layers 112 and 113 formed on opposite end surfaces of the capacitance forming portion in the first direction (the Z direction), respectively.

The capacitance forming portion, which contributes to forming capacitance of a multilayer capacitor, may be formed by repeatedly stacking a plurality of first and second internal electrodes 121 and 122 in the first direction (the Z direction) with each of the dielectric layers 111 interposed therebetween.

The protective layers 112 and 113 may be formed by stacking a single dielectric layer or two or more dielectric layers on opposite end surfaces of the capacitance forming portion in the first direction (the Z direction), respectively, and may basically serve to prevent damage to the internal electrodes due to physical or chemical stress.

The protective layers 112 and 113 do not include the internal electrodes, and may include the same material as the dielectric layer 111.

The dielectric layers 111 may include the first and second dielectric layers 111a and 111b alternately disposed in the first direction (the Z direction).

The first internal electrode 121 exposed to the third surface 3 of the body 110 and the first dummy pattern d1 spaced apart from the first internal electrode and exposed to the fourth surface 4 of the body 110 may be disposed on the first dielectric layer 111a, and the second internal electrode 122 exposed to the fourth surface 4 of the body 110 and the second dummy pattern d2 spaced apart from the second internal electrode and exposed to the third surface 3 of the body 110 may be disposed on the second dielectric layer 111b.

Referring to FIGS. 2 and 7, the first internal electrodes 121 and the second dummy patterns d2 may be alternately disposed on the third surface 3. In addition, the second internal electrodes 122 and the first dummy patterns d1 may be alternately disposed on the fourth surface 4.

When the internal electrode is exposed externally of the body except for a portion thereof connected to the external electrode, a short circuit may occur due to introduction of conductive foreign materials or the like, such that reliability of the multilayer electronic component may decrease. Therefore, in the related art, when the internal electrode is formed on the dielectric layer, the dielectric layer was formed to have an area larger than that of the internal electrode, such that a margin was formed on the remaining circumferential portions of the internal electrode except for the portion of the internal electrode connected to the external electrode. That is, the margin portion refers to a region of the dielectric layer in which the internal electrode is formed. When the internal electrode is formed on the dielectric layer in a manufacturing process, the internal electrode has a shape in which it protrudes from the margin portion. A step portion occurs due to such a protruding shape, and when tens to hundreds of dielectric layers are stacked, the dielectric layers are stretched to fill these step portions. When the dielectric layers are stretched, the internal electrodes are also warped. When the internal electrodes are warped, a problem that a breakdown voltage (BDV) decreases in corresponding portions occurs.

Since the first internal electrode 121 is disposed to be spaced apart from the fourth surface 4 and the second internal electrode 122 is disposed to be spaced apart from the third surface 3, step portions may occur due to thickness differences of the internal electrodes 121 and 122 at both distal ends of the body 110 in the length direction (the X direction).

According to an exemplary embodiment in the present disclosure, since the first internal electrode 121 exposed to the third surface 3 of the body 110 and the first dummy pattern d1 spaced apart from the first internal electrode and exposed to the fourth surface 4 of the body 110 are disposed on the first dielectric layers 111a and the second internal electrode 122 exposed to the fourth surface 4 of the body 110 and the second dummy pattern d2 spaced apart from the second internal electrode and exposed to the third surface 3 of the body 110 are disposed on the second dielectric layer 111b, the step portions occurring due to the thickness differences of the internal electrodes 121 and 122 at both distal ends of the body 110 in the length direction (the X direction) may be suppressed.

In addition, in a case of a general internal electrode form according to the related art, internal electrodes are alternately exposed at both distal ends of the body in the length direction (the X direction), but are not generally exposed at both distal ends of the body in the width direction (the Y direction). Therefore, the step portions occurring due to the thickness differences of the internal electrodes may be more severe at both distal ends of the body in the width direction (the Y direction) than at both distal ends of the body in the length direction (the X direction).

According to an exemplary embodiment in the present disclosure, the first internal electrode 121 may include the first main portion 121m disposed to be spaced apart from the fifth and sixth surfaces and the first and second side portions 121s1 and 121s2 disposed on the opposite side surfaces of the first main portion, respectively, and exposed to the third surface, and the second internal electrode 122 may include the second main portion 122m disposed to be spaced apart from the fifth and sixth surfaces and the third and fourth side portions 122s3 and 122s4 disposed on the opposite side surfaces of the second main portion, respectively, and exposed to the fourth surface.

The first and second main portions 121m and 122m corresponding to general internal electrodes according to the related art may be configured not to have the same position in the width direction when they are formed on the dielectric layers 111. That is, when the plurality of dielectric layers 111 are stacked, the first and second main portions 121m and 122m positioned adjacent to each other to in a vertical direction may be configured to have different positions in the width direction.

Referring to FIG. 8, the first main portion 121m of the first dielectric layer 111a stacked an upper portion in the vertical direction and the second main portion 122m of the second dielectric layer 111b stacked at a lower portion in the vertical direction may be stacked in a staggered manner in the width direction, and the step portions in the width direction may thus be suppressed.

In addition, the first and second side portions 121s1 and 121s2 and the third and fourth side portions 122s3 and 122s4 may be disposed on the opposite side surfaces of the main portions 121m and 122m in the width direction, respectively, to further suppress the step portions in the width direction.

That is, according to an exemplary embodiment in the present disclosure, the dummy patterns d1 and d2 may be disposed to suppress the step portions in the length direction (the X direction), and the first main portion 121m of the first dielectric layer 111a stacked at the upper portion and the second main portion 122m of the second dielectric layer 111b stacked at the lower portion may be stacked in the staggered manner in the width direction and the side portions 121s1, 121s2, 122s3, and 122s4 may be disposed to suppress the step portions in the width direction (the Y direction).

Since the first and second dielectric layers 111a and 111b are alternately disposed in the first direction (the Z direction), the first and second internal electrodes 121 and 122 may also be alternately disposed in the first direction (the Z direction).

The first internal electrode 121 and the second dummy pattern d2 may be electrically connected to a first external electrode 131 through the third surface, and the second internal electrode 122 and the first dummy pattern d1 may be electrically connected to a second external electrode 132 through the fourth surface. The first and second dummy patterns may not contribute to forming capacitance, and may serve to suppress the step portions in the length direction.

The first and second internal electrodes 121 and 122 may be electrically separated from each other by each of the dielectric layers 111a and 111b disposed therebetween.

A material of each of the internal electrodes 121 and 122 and the dummy patterns d1 and d2 is not particularly limited, and may be a material having excellent electrical conductivity. For example, the internal electrodes 121 and 122 may be formed by printing a conductive paste including one or more of nickel (Ni), copper (Cu), palladium (Pd), silver (Ag), gold (Au), platinum (Pt), tin (Sn), tungsten (W), titanium (Ti), and alloys thereof on ceramic green sheets.

A method of printing the conductive paste may be a screen printing method, a gravure printing method or the like, but is not limited thereto.

In this case, the internal electrodes 121 and 122 and the dummy patterns d1 and d2 may be formed using the same material, but are not limited thereto. That is, the internal electrodes 121 and 122 and the dummy patterns d1 and d2 may also be formed by printing different conductive pastes on ceramic green sheets.

Referring to FIGS. 3 through 5, a distance G1 by which the first main portion 121m is spaced apart from the fifth surface 5 may be longer than a distance G1' by which the first main portion 121m is spaced apart from the sixth surface 6, and a distance G2 by which the second main portion 122m is spaced apart from the fifth surface 5 may be shorter than a distance G2' by which the second main portion 122m is spaced apart from the sixth surface 6. Therefore, the first main portion 121m and the second main portion 122m may be stacked in the staggered manner.

In this case, a difference between the distance G1 by which the first main portion is spaced apart from the fifth surface and the distance G2 by which the second main portion is spaced apart from the fifth surface may be 0.05 times or more and 0.2 times or less the width Wm1 of the first main portion. That is, $0.05*Wm1 \leq G1-G2 \leq 0.2*Wm1$.

The reason is that when the difference between the distance G1 by which the first main portion is spaced apart from the fifth surface and the distance G2 by which the second main portion is spaced apart from the fifth surface is less than 0.05 times the width Wm1 of the first main portion, an effect of suppressing the step portions in the width direction may be insufficient, and when the difference between the distance G1 by which the first main portion is spaced apart from the fifth surface and the distance G2 by which the second main portion is spaced apart from the fifth surface is greater than 0.2 times the width Wm1 of the first main portion, it may be difficult to secure high capacitance.

In addition, the width Wm1 of the first main portion and a width Wm2 of the second main portion may be substantially the same as each other. Therefore, an effect of suppressing the step portions in the width direction may be secured as much as possible, and capacitance may be secured as much as possible. Herein, one or ordinary skill in the art would understand that the expression "substantially the same" refers to being the same by allowing process errors, positional deviations, and/or measurement errors that may occur in a manufacturing process.

Widths of the first and second side portions 121s1 and 121s2 may decrease as the first and second side portions 121s1 and 121s2 become distant from the third surface, and widths of the third and fourth side portions 122s3 and 122s4 may decrease as the third and fourth side portions 122s3 and 122s4 become distant from the fourth surface.

When the widths of the side portions 121s1, 121s2, 122s3, and 122s4 are constant and are long, electrical connectivity between the internal electrodes and the external electrodes may be secured, but a bonding area between the first dielectric layer 111a and the second dielectric layer 111b at an edge portion of the body may become excessive small, such that a coupling force may decrease, and delamination may occur at the edge portion of the body.

Conversely, when the widths of the side portions 121s1, 121s2, 122s3, and 122s4 are constant and short, it may be difficult to secure electrical connectivity between the internal electrodes and the external electrodes, and an effect of suppressing the step portions in the width direction may be insufficient.

Therefore, in an exemplary embodiment in the present disclosure, the electrical connectivity between the internal electrodes 121 and 122 and the external electrodes 131 and 132 may be secured by making widths Ws1, Ws2, Ws3, and Ws4 of the side portions exposed to the third surface and the fourth surface as large as possible, and an effect of suppressing the delamination and suppressing the step portions in the width direction may be sufficiently secured by making widths of the side portions 121s1, 121s2, 122s3, and 122s4 smaller toward a central portion of the body in the length direction (the X direction).

The first side portion 121s1 may be disposed on one side surface, close to the sixth surface, of the opposite side surfaces of the first main portion 121m and the second side portion 121s2 may be disposed on the other side surface of the opposite side surfaces of the first main portion 121m, and the third side portion 123s3 may be disposed on one side surface, close to the sixth surface, of the opposite side surfaces of the second main portion 122m and the fourth side portion 121s4 may be disposed on the other side surface of the opposite side surfaces of the second main portion 122m. Here, the opposite side surfaces refer to opposite side surfaces in the width direction (the Y direction).

In this case, the width Ws1 of the first side portion exposed to the third surface may be smaller than the width Ws2 of the second side portion exposed to the third surface, and the width Ws3 of the third side portion exposed to the fourth surface may be greater than the width Ws4 of the fourth side portion exposed to the fourth surface. According to an exemplary embodiment in the present disclosure, the distance G1 by which the first main portion 121m is spaced apart from the fifth surface 5 may be longer than the distance G1' by which the first main portion 121m is spaced apart from the sixth surface 6, and the distance G2 by which the second main portion 122m is spaced apart from the fifth surface 5 may be shorter than the distance G2' by which the second main portion 122m is spaced apart from the sixth surface 6. Therefore, Ws1<Ws2 and Ws3>Ws4, such that a step portion suppression effect and an electrical connectivity improvement effect of the side portions may be significantly increased.

In addition, the width Ws1 of the first side portion exposed to the third surface and the width Ws4 of the fourth side portion exposed to the fourth surface may be 0.2 times or more and 1.0 times or less the distance G2 by which the second main portion is spaced apart from the fifth surface, and the width Ws2 of the second side portion exposed to the third surface and the width Ws3 of the third side portion exposed to the fourth surface may be 0.2 times or more and 1.0 times or less the distance G1 by which the first main portion is spaced apart from the fifth surface.

When the width Ws1 and the width Ws4 are less than 0.2 times the distance G2, a connectivity improvement effect between the internal electrodes and the external electrodes and a step portion suppression effect may be insufficient, and when the width Ws1 and the width Ws4 is greater than 1.0 times the distance G2, it will exceed a width of the body, and it may thus be difficult to form the first side portion and the fourth side portion so that the width Ws1 and the width Ws4 is greater than 1.0 times the distance G2.

In addition, when the width Ws2 and the width Ws3 are less than 0.2 times the distance G1, a connectivity improvement effect between the internal electrodes and the external electrodes and a step portion suppression effect may be insufficient, and when the width Ws2 and the width Ws3 is greater than 1.0 times the distance G1, it will exceed the width of the body, and it may thus be difficult to form the second side portion and the third side portion so that the width Ws2 and the width Ws3 is greater than 1.0 times the distance G1.

In addition, a length Ls1 at which the first side portion and the first main portion are in contact with each other may be smaller than a length Ls2 at which the second side portion and the first main portion are in contact with each other, and a length Ls3 at which the third side portion and the second main portion are in contact with each other may be greater than a length Ls4 at which the fourth side portion and the second main portion are in contact with each other.

That is, Ls1<Ls2 and Ls3>Ls4, and the step portion suppression effect of the side portions may thus be significantly increased.

In addition, the length Ls1 at which the first side portion and the first main portion are in contact with each other and the length Ls4 at which the fourth side portion and the second main portion are in contact with each other may be 0.4 times or more and 3.0 times or less the distance G2 by which the second main portion is spaced apart from the fifth surface, and the length Ls2 at which the second side portion and the first main portion are in contact with each other and the length Ls3 at which the third side portion and the second main portion are in contact with each other may be 0.4 times or more and 3.0 times or less the distance G1 by which the first main portion is spaced apart from the fifth surface.

When the length Ls1 and the length Ls4 are less than 0.4 times the distance G2, a step portion suppression effect may be insufficient, and when the length Ls1 and the length Ls4 are greater than 3.0 times the distance G2, a coupling force between the first dielectric layer 111a and the second dielectric layer 111b may become insufficient.

When the length Ls2 and the length Ls3 are less than 0.4 times the distance G1, a step portion suppression effect may be insufficient, and when the length Ls2 and the length Ls3 are greater than 3.0 times the distance G1, a coupling force between the first dielectric layer 111a and the second dielectric layer 111b may become insufficient.

Meanwhile, the second side portion 121s2 may be disposed to partially overlap the second main portion 122m, and the third side portion 121s3 may be disposed to partially overlap the first main portion 121m. Therefore, not only a step portion suppression effect, but also a capacitance improvement effect may be secured.

Meanwhile, a width of the first dummy pattern d1 may decrease as the first dummy pattern d1 becomes distant from the fourth surface, and a width of the second dummy pattern d2 may decrease as the second dummy pattern d2 becomes distant from the third surface.

When the widths of the dummy patterns d1 and d2 are constant and long, an effect of suppressing the step portions in the width direction may be improved, but a bonding area between the first dielectric layer 111a and the second dielectric layer 111b at the edge portion of the body may become excessive small, such that a coupling force may decrease, and delamination may occur at the edge portion of the body.

Conversely, when the widths of the first and second dummy patterns d1 and d2 are constant and short, an effect of suppressing the step portions in the width direction may be insufficient.

Therefore, in an exemplary embodiment in the present disclosure, the step portions in the width direction may be suppressed by making widths Wd1 and Wd2 of the dummy patterns exposed to the third surface 3 and the fourth surface 4 as large as possible, and the delamination may be suppressed by making widths of the first and second dummy patterns d1 and d2 smaller toward the central portion of the body 110 in the length direction (the X direction).

In addition, the width Wd1 of the first dummy pattern d1 exposed to the fourth surface 4 may be 0.95 times to 1.05 times the width We2 of the second internal electrode 122 exposed to the fourth surface 4, and the width Wd2 of the second dummy pattern d2 exposed to the third surface 3 may be 0.95 times to 1.05 times the width We1 of the first internal electrode 121 exposed to the third surface 3.

That is, as illustrated in FIG. 7, Wd2 and We1 may be substantially the same as each other on the third surface 3. In addition, Wd1 and We2 may also be substantially the same as each other on the fourth surface. Therefore, the widths of the first and second dummy patterns d1 and d2 and the side portions 121s1, 121s2, 122s3, and 122s4 may be secured as large as possible to significantly increase an effect of suppressing step portions according to each configuration.

The first dummy pattern d1 may have substantially the same width as the second internal electrode 122 in a region in which it overlaps the second internal electrode 122, and the second dummy pattern d2 may have substantially the same width as the first internal electrode 121 in a region in which it overlaps the first internal electrode 121.

That is, an entire area of the first dummy pattern d1 may substantially overlap the second internal electrode 122, and an entire area of the second dummy pattern d2 may substantially overlap the first internal electrode 121.

The external electrodes 131 and 132 may be disposed on the body 110, and may be connected to the internal electrodes 121 and 122, respectively.

The external electrodes 131 and 132 may include the first external electrode 131 disposed on the third surface 3 of the body 110 and connected to the first internal electrodes 121 and the second dummy patterns d2 and the second external electrode 132 disposed on the fourth surface 4 of the body 110 and connected to the second internal electrodes 122 and the first dummy patterns d1, as illustrated in FIG. 6.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

For example, as illustrated in FIG. 6, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be fired electrodes including a conductive metal and glass or resin-based electrodes including a conductive metal or a resin.

Alternatively, the electrode layers 131a and 132a may have a form in which fired electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a fired electrode. Alternatively, the first and second electrode layers 131a and 132a may be formed by, for example, an atomic layer deposition (ALD) method, a molecular layer deposition (MLD) method, a chemical vapor deposition (CVD) method, a sputtering method, or the like.

The conductive metal used for the electrode layers 131a and 132a is not particularly limited as long as it is any material that may be electrically connected to the internal electrodes in order to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

Asset forth above, according to an exemplary embodiment, the dummy patterns may be disposed to suppress the step portions in the length direction, and the internal electrodes may be arranged in a staggered manner in the width direction and the side portions may be disposed on the opposite side surfaces of the internal electrodes to suppress the step portions in the width direction, such that both the step portions in the with and length directions may be suppressed. Therefore, the reliability of the multilayer electronic component may be improved.

In addition, the side portions may be disposed to improve the electrical connectivity between the internal electrodes and the external electrodes.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
   a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, the body including first and second dielectric layers alternately disposed in the first direction; and
   external electrodes disposed on the third and fourth surfaces, respectively,
   wherein a first internal electrode exposed to the third surface and a first dummy pattern spaced apart from the first internal electrode and exposed to the fourth surface are disposed on the first dielectric layer,
   a second internal electrode exposed to the fourth surface and a second dummy pattern spaced apart from the second internal electrode and exposed to the third surface are disposed on the second dielectric layer,
   the first internal electrode includes a first main portion disposed to be spaced apart from the fifth and sixth surfaces and first and second side portions disposed on opposite side surfaces of the first main portion, respectively, and exposed to the third surface, the first and second side portions being different in size and disposed asymmetrically relative to a central axis of the first dielectric layer in the second direction,
   the second internal electrode includes a second main portion disposed to be spaced apart from the fifth and sixth surfaces and third and fourth side portions disposed on opposite side surfaces of the second main portion, respectively, and exposed to the fourth surface, the third and fourth side portions being different in size and disposed asymmetrically relative to a central axis of the second dielectric layer in the second direction, and
   the first main portion and the second main portion are arranged in a staggered manner in the third direction.

2. The multilayer electronic component of claim 1, wherein a difference between a distance from the first main portion to the fifth surface and a distance from the second main portion to the fifth surface is 0.05 times or more and 0.2 times or less a width of the first main portion.

3. The multilayer electronic component of claim 2, wherein the first and second main portions have substantially the same width as each other.

4. The multilayer electronic component of claim 1, wherein widths of the first and second side portions decrease in a direction away from the third surface, and widths of the third and fourth side portions decrease in a direction away from the fourth surface.

5. The multilayer electronic component of claim 4, wherein the first side portion is disposed on a first side surface, close to the sixth surface, among the opposite side surfaces of the first main portion, and the second side portion is disposed on a second side surface among the opposite side surfaces of the first main portion, and the third side portion is disposed on a first side surface, close to the sixth surface, among the opposite side surfaces of the second main portion and the fourth side portion is disposed on a second side surface among the opposite side surfaces of the second main portion.

6. The multilayer electronic component of claim 5, wherein a width of the first side portion exposed to the third surface is smaller than a width of the second side portion exposed to the third surface, and a width of the third side portion exposed to the fourth surface is greater than a width of the fourth side portion exposed to the fourth surface.

7. The multilayer electronic component of claim 5, wherein a width of the first side portion exposed to the third surface and a width of the fourth side portion exposed to the fourth surface is 0.2 times or more and 1.0 times or less a distance from the second main portion to the fifth surface, and a width of the second side portion exposed to the third surface and a width of the third side portion exposed to the fourth surface is 0.2 times or more and 1.0 times or less a distance from the first main portion to from the fifth surface.

8. The multilayer electronic component of claim 5, wherein a length of an interface at which the first side portion and the first main portion are in contact with each other is smaller than a length of an interface at which the second side portion and the first main portion are in contact with each other, and a length of an interface at which the third side portion and the second main portion are in contact with each other is greater than a length of an interface at which the fourth side portion and the second main portion are in contact with each other.

9. The multilayer electronic component of claim 5, wherein a length at which the first side portion and the first main portion are in contact with each other and a length at which the fourth side portion and the second main portion are in contact with each other is 0.4 times or more and 3.0 times or less a distance from the second main portion to the fifth surface, and a length of an interface at which the second side portion and the first main portion are in contact with each other and a length of an interface at which the third side portion and the second main portion are in contact with each other is 0.4 times or more and 3.0 times or less a distance from the first main portion to the fifth surface.

10. The multilayer electronic component of claim 5, wherein the second side portion is disposed to partially overlap the second main portion, and the third side portion is disposed to partially overlap the first main portion.

11. The multilayer electronic component of claim 4, wherein a width of the first dummy pattern decreases in a direction away from the fourth surface, and a width of the second dummy pattern decreases in a direction away from the third surface.

12. The multilayer electronic component of claim 4, wherein a width of the first dummy pattern exposed to the fourth surface is 0.95 times to 1.05 times a width of the second internal electrode exposed to the fourth surface, and a width of the second dummy pattern exposed to the third surface is 0.95 times to 1.05 times a width of the first internal electrode exposed to the third surface.

13. The multilayer electronic component of claim 4, wherein a width of the first dummy pattern exposed to the fourth surface is substantially the same as a width of the second internal electrode exposed to the fourth surface, and a width of the second dummy pattern exposed to the third surface is substantially the same as a width of the first internal electrode exposed to the third surface.

14. A multilayer electronic component comprising:

a body including first and second dielectric layers alternately disposed in a stacked direction, first and second internal electrodes disposed on the first and second dielectric layers, respectively, and first and second dummy patterns disposed on the first and second dielectric layers and spaced apart from the first and second internal electrodes, respectively; and external electrodes disposed on first and second end surfaces of the body, respectively, opposing each other in a length direction, wherein the first internal electrode and the first dummy pattern are exposed to the first and second end surfaces, respectively, and the second internal electrode and the second dummy pattern are exposed to the second and first end surfaces, respectively, and outer edges of the first and second internal electrodes deviate asymmetrically relative to a length-wise central axis of the first and second dielectric layers from each other in a width direction perpendicular to the length direction and the stacked direction.

15. The multilayer electronic component of claim 14, wherein a width of the first dummy pattern decreases in a direction away from the second end surface of the body, and a width of the second dummy pattern decreases in a direction away from the first end surface of the body.

16. The multilayer electronic component of claim 14, wherein a width of the first internal electrode decreases in a direction away from the first end surface of the body, and a width of the second internal electrode decreases in a direction away from the second end surface of the body.

17. A multilayer electronic component comprising:

a body including first and second dielectric layers alternately disposed in a stacked direction, first and second internal electrodes disposed on the first and second dielectric layers, respectively, and first and second dummy patterns disposed on the first and second dielectric layers and spaced apart from the first and second internal electrodes, respectively;

external electrodes disposed on first and second end surfaces of the body, respectively, opposing each other in a length direction, wherein the first internal electrode and the first dummy pattern are exposed to the first and second end surfaces, respectively, and the second internal electrode and the second dummy pattern are exposed to the second and first end surfaces, respectively, a width of at least one of the first and second dummy patterns changes in the length direction symmetrically relative to a length-wise central axis of the first and second dielectric layers, a width of the first internal electrode decreases in a direction away from the first end surface of the body asymmetrically relative to the length-wise central axis of the first and second dielectric layers, and a width of the second internal electrode decreases in a direction away from the second end surface of the body asymmetrically relative to the length-wise central axis of the first and second dielectric layers.

18. The multilayer electronic component of claim 17, wherein the first and second internal electrodes are arranged in a staggered manner in a width direction perpendicular to the length direction and the stacked direction.

* * * * *